Aug. 10, 1954     M. M. STEWART     2,686,161
SILICEOUS CONTACT MATERIAL AND METHOD OF MANUFACTURE
Filed June 28, 1950
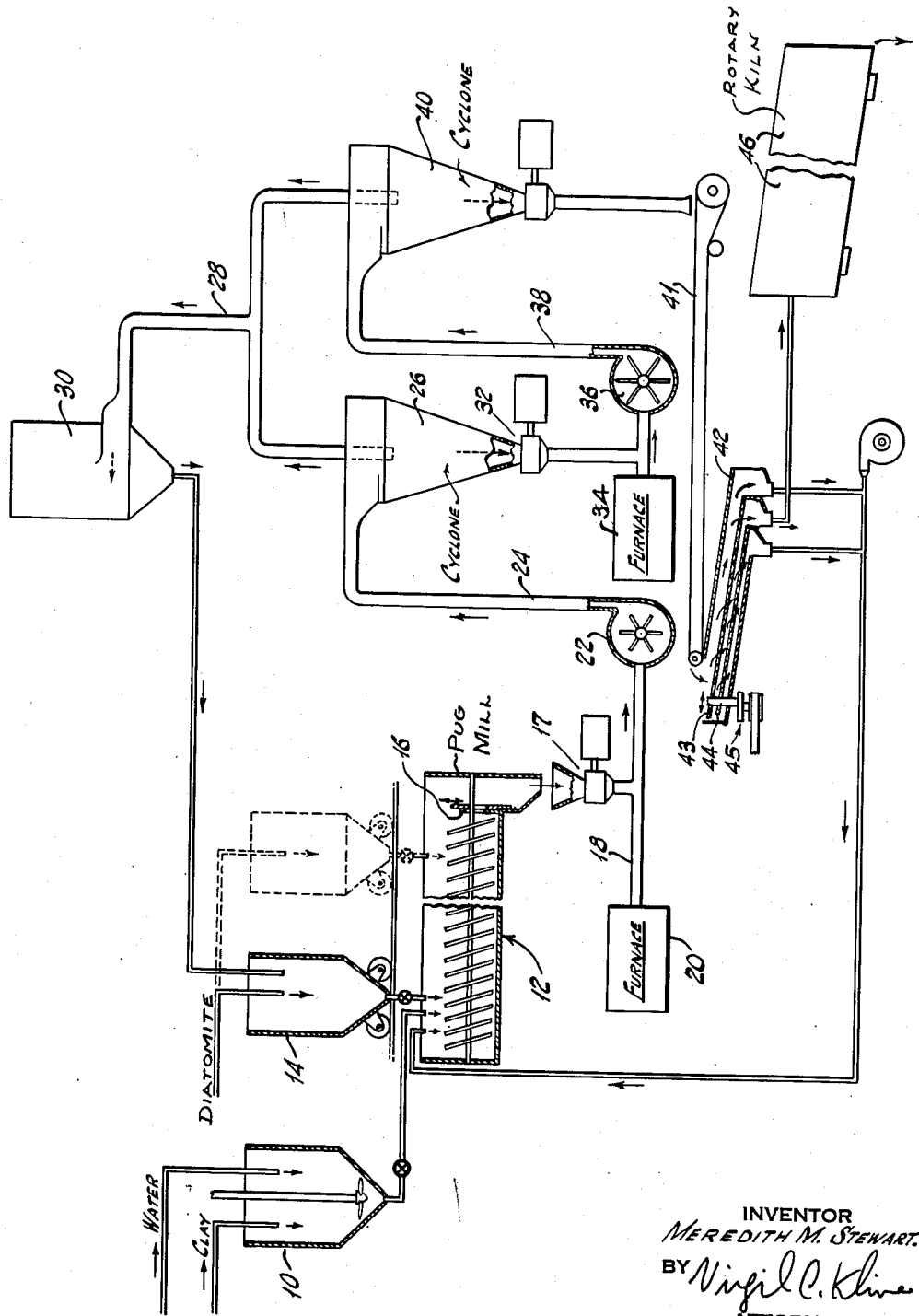
INVENTOR
MEREDITH M. STEWART.
BY
ATTORNEY

Patented Aug. 10, 1954

2,686,161

UNITED STATES PATENT OFFICE

2,686,161

SILICEOUS CONTACT MATERIAL AND METHOD OF MANUFACTURE

Meredith M. Stewart, Oakmont, Pa., assignor to Johns-Manville Corporation, New York, N. Y., a corporation of New York Application June 28, 1950, Serial No. 170,718

8 Claims. (Cl. 252—448)

This invention relates to siliceous catalyst carriers or contact materials for promoting chemical reactions, and is particularly directed to the manufacture of physically strong and porous microspherular siliceous aggregates adapted for use as fluid bed contact material.

For many years vapor phase chemical reactions such as cracking, oxidation and dehydration were carried out by causing the reactants to flow in a fluid stream through a stationary bed of granular or pelleted contact material. More recently such reactions have been carried out in a fluid bed reactor wherein the reactant vapors pass upward through a column which is partially filled with a finely divided catalyst or contact material. In a fluid bed reactor the initial vapor or gas flow aerates the bed of finely divided contact material thereby reducing its bulk density approximately in half. When the linear velocity of the reactant vapor and gas has reached a critical value, their flow causes the finely divided contact material to flow about within the contact zone almost as freely as if it were a liquid. The state of fluid suspension thus developed within the contact area has been described as fluidization or fluid flow, and its most outstanding characteristic is the very rapid transfer of heat which takes place throughout the reaction zone as a result of the complete and rapid circulation of the finely divided solid. Temperature gradients virtually disappear, and heat can be removed smoothly and rapidly from the reaction zone by introducing a suitable number of cooling tubes. The fluid bed reactor has been widely adopted for promoting highly exothermic reactions which are difficult or impossible to control in fixed bed operations.

In both fixed bed and fluid bed reactions the contact material becomes rapidly contaminated with carbon or other by-products of the main reaction so that it is necessary to regenerate the contact material or catalyst frequently, as by controlled oxidation.

A fluid bed contact material must have a comparatively porous structure or low density, because its value as a contact material or catalyst support depends on the area of contact surface presented to the reactant vapors. Likewise a contact material or catalyst support for use in fluid bed reactions must exhibit good flow properties and a high resistance to attrition. Good fluid flow properties primarily depend on a spherular particle shape and on a suitable particle size distribution, and may be comparatively determined by physical tests such as measurements of the angle of repose of a fully aerated contact material. A high resistance to attrition is necessary to withstand the severe service conditions which are developed and continually maintained within the fluid flow reaction zone, as well as within the regenerating zones, in which the material may undergo frequent and severe thermal shocks as well as physical attrition.

An object of the present invention is to provide microspherular siliceous particle aggregates having adequate porosity, fluid flow properties, and resistance to attrition to adapt them for use as a fluid bed contact material. A further object is to provide a spherular aggregate granule of low bulk density and high silica content comprising chiefly finely divided diatomaceous silica. Another object is to provide a method of agglomerating finely divided diatomaceous earth with a small amount of ceramic binder and flash drying, milling, classifying and calcining the agglomerate to produce microspherular granules having suitable fluid flow properties and attrition resistance, without substantial reduction of inherent porous diatom structure.

With the foregoing objects in view, the invention consists of the microspherular siliceous contact material and method of manufacture which are hereinafter described and more particularly defined in the accompanying claims.

In the following description of a preferred embodiment of the invention, reference will be made to the accompanying drawing, which presents in schematic flow sheet form the principal operations and equipment requirements for practicing the invention.

An initial critical step in producing a microspherular product consists of kneading or pugging a mixture of finely divided diatomaceous earth of relatively high silica content and a small amount of clay binder plasticized with a suitably proportioned amount of water, under controlled conditions of agitation and charge proportioning to produce a granular agglomerate of mealy consistency. The pugging operation is followed by steps of flash drying, densifying, spherulizing, and classifying the agglomerate product of the pugging operation to produce spherular granules of optimum size classification, and finally calcining the granules to develop a strong high temperature resistant ceramic bond.

The diatomaceous material preferably consists of a milled raw earth having a particle size distribution, as determined by the Oden sedimentation test, of at least 50% finer than 5 microns. The diatomaceous earth particles should have a silica content of at least 75%, together with nonsiliceous impurities comprising chiefly magnesia, alumina and iron and calcium oxides. A preferred ceramic binder is clay of fine substantially uniform grain size, such as kaolin or bentonite clay.

The present fluid bed contact material is a microspherular siliceous aggregate granule ranging in size broadly between 20 and 300 microns diameter and having high attrition resistance. An optimum initial charge of a fluid bed reactant should classify as to size chiefly in the range of 80–200 microns, since the average size is gradually reduced by attrition during service in fluid bed reaction. The product should always contain a limited amount of material ranging between 20 and 40 microns, in order to reduce attrition losses and to improve fluid flow properties. Particles finer than 20 microns are not retained in the fluid bed for any substantial time. Granules of adequate strength have been obtained when using bentonite clay as a binder in proportions ranging between 5 and 25% by weight of the diatomaceous silica.

The pugging operation may be initiated by forming a bentonite-water slurry, as in mixing tank 10 of the accompanying flow sheet, and allowing such slurry to stand for several hours in order to develop maximum swelling of the bentonite particles. The clay may be plasticized with only part of the water required for forming a slurry, in a conventional screw or beater type mixer, with the balance of the water required for pugging added at the pugging stage. The water-plasticized clay or slurry is charged to the feed end of a continuous kneading mixer or pug mill 12, where it is admixed with finely divided diatomaceous silica. The diatomaceous silica may be introduced gradually to the pug mill from a feed chamber 14. Feed chamber 14 is shown as movably mounted (as on wheels engaging a supporting track) in order that it may be reciprocated over the open top of pug mill 12 to allow of charging some of the diatomaceous silica at positions farther along toward the discharge end of the mill, as indicated by the dotted position of chamber 14.

In order to produce a granular agglomerate of desired mealy consistency at the discharge end of the pug mill, it is necessary to limit the initial portion of diatomaceous silica introduced at the charge end of the mill to an amount (usually about half of the full diatomite charge) which is well wetted by the bentonite slurry, and thereafter gradually add the balance of the diatomaceous silica to the charge at advanced positions toward the discharge end of the mill. The charge is held in the mill for the time necessary to develop an agglomerate of mealy consistency made up of roughly spherular well-moistened soft granules which appear to have an average size of 10 to 60 mesh.

A preferred pugging procedure for a microspherular product contemplates limiting the moisture content of the pug mill discharge within 40–50% by weight, maintaining the depth of charge in the mill, as by adjustable weir 16, within the limits of one-half to three-fourths of the mill capacity, and adjusting the period of pugging by varying the depth of charge and by proper adjustment of the pitch and rotating speed of the pug mill kneading or agitating blades, to approximately 30–40 minutes. An excessively wet or shallow pug mill charge, or an excessively long period of pugging, tends to build up the size of the agglomerate granules to dimensions substantially in excess of 10 mesh, which granules are too large for efficient manufacture of satisfactory yields of a microspherular product having fluid flow characteristics. The step of adding about half of the diatomaceous solica to the pug mill gradually after the initial pugging and wetting of the other half of the diatomaceous silica charge, gives much better control of the pugging operation and allows for thorough wetting and pugging of the initial portion of the charge, while the added dry material prevents agglomeration of the initial granules into large masses.

At that period in the pug mill cycle when the initial charge has been pugged long enough to give the required body and density, the formation of spherular granules is initiated by gradually adding the remaining finely divided diatomaceous silica. This operation reduces the moisture of the agglomerated wet pugged material and breaks up the agglomerates into spherular granules as a result of the rolling action developed in the charge by the rotating pug mill blades. The addition of dry powdered diatomite should be gradual and continuous during the granule forming stage, in order to inhibit excessive wetting of the developing spherular granules, with resulting agglomeration.

A substantial proportion of the diatomaceous charge added at the inlet end of the pug mill may advantageously consist of recycle fines and over-size material returned to the pug mill from the cyclones and from the screen classifier. Control of the size of the individual grains of the granular product produced in the pugging operation is effected largely by the control of the rate of charging materials to the feed end of the pug mill, the rate of addition of dry diatomite powder after the initial wetting and pugging of the charge, and the rate of addition of water to the initial charge. Other factors controlling the size and density of the granules in the pugged product are the depth of material maintained in the mill and the time of retention of the pugged charge within the mill. The pugging which takes place after the initially agglomerated wet charge is broken up by the addition of finely divided dry powder at points spaced from the feed end of the mill, serves to develop movement of moisture towards the surfaces of the granules and to initiate granule formation by developing adherence of adjacent granules into larger granules. For this reason it is desirable to strictly limit the moisture content of the charge when producing microspheres in order to avoid excessive agglomeration.

After thus forming a moist granular agglomerate of finely divided diatomaceous silica and bentonite of the mealy consistency specified, the next operating step consists in feeding the pugged material at a controlled rate into a flash drying and densifying unit in which the product is dried, densified, spherulized and cyclone classified to form spherular granules of adequate strength and size for subjecting to a final size grading and calcining treatment.

The mealy agglomerate may be delivered by rotary feed valve 17 into a stream of hot combustion gases flowing in the exhaust flue 18 of a furnace 20. The moist pug mill granulated charge is thus suspended in the hot gas stream and is carried thereby through a substantially non-milling propeller fan 22 (with wide clearance between the blades and the housing) and thence through the fan discharge pipe 24 into the tangential top inlet of a cyclone separator 26. While transported in gas suspension through the fan 20, pipe 24, and cyclone 26, the moist agglomerate granules are subjected to rather mild impact attrition and shaping or spherulizing treatment, and simultaneously to the initial flash drying effect of furnace gases having a temperature approximating 700–800° F. Fines developed by attrition in this stage exit from the cyclone through pipe 28 and are collected in baghouse 30, from which they may be recycled to the charging end of pug mill 12. The coarser granules which collect in the bottom of cyclone 26 are much harder, denser, and of more uniform finer size and spherular shape, as compared to the pug mill agglomerate granules fed to the fan 22.

It is frequently necessary to further flash dry and mill the coarse product which collects in the bottom of cyclone 26. To accomplish this the coarse partially dried and spherulized granules may be delivered from the bottom of cyclone 26 through a rotary feed valve 32 into a second stream of combustion gases discharged from a furnace 34. The granular product is carried in suspension by said gases through a milling fan 36 (with close clearance between the blades and the housing) and thence through discharge conduit 38 into the top of a second cyclone separator 40. In traversing the fan 36 and its tubular connections with cyclone 40, the granular product of the second flash drier undergoes further drying and rather severe milling and spherulizing treatment, with the result that the coarser granules which collect in the bottom of cyclone 40 are of fairly uniform microspherular size and shape and of strongly bonded attrition resistant structure.

Since only a rough size classification can be developed by the operation of the cyclones 26 and 40, the granular product which collects in the bottom of cyclone 40 may be delivered by a rotary valve onto conveyor 41 and subjected to a further size classification within a vibratory or gyratory screen classifier 42, wherein excessively fine and excessively coarse material is separated by screens 43 and 44 from the desired product of optimum size range. Screens 43 and 44 are oscillated at controlled rate by an eccentric 45. Such excessively fine and coarse material may be returned to the feed end of the pug mill as indicated, while the material of suitable size classification is charged to the feed end of a rotary calcining kiln 46. The calcining kiln is operated to subject the substantially dry microspherular granules to a ceramic hardening treatment accompanied by agitation for about one hour at a temperature approximating 1800° F.

The calcined microspherular granules herein described generally have bulk densities in the range 25–40 lbs./cu. ft. and will absorb (in accordance with a modified Gardner-Coleman test) at least 50% by weight of water. These spherular granules comprise chiefly diatomaceous silica and have a silica content ranging upwardly from 67.5% by weight. The granules have high attrition resistance, and they resist structural change under exposure to temperatures at least as high as 2000° F.

As illustrating the importance of proper pugging, a suitably proportioned pug mill charge of water, finely divided diatomite, and bentonite clay was pugged for a period of about one-half hour beyond the stage where a mealy consistency developed, with the result that the size of the granules making up the resulting agglomerate average chiefly in the range through 4 mesh and retained on 20 mesh screen. On attempting to run the coarse material discharged from this pugging operation through the previously described flash drying and milling equipment, the recovery of microspherular pellets of size classification in the acceptable fluidizable range amounted to no more than about 25% by weight of the original dry weight of pug mill solids.

It is likewise true that use of an insufficient amount of water in the pugging operation, or too short a period of pugging, produces a too dry product which develops, during the flash drying and milling treatment, an excessively high proportion of fines. Moreover, much of this excessively dry product within the fluid bed range of size classification was of unacceptably low density and low attrition resistance.

In the following table data is presented showing that the size classification of a microspherular contact material developed by the flash drying and milling of a properly pugged granular agglomerate can be quite accurately controlled by the speed of the milling fan 36:

| Test No. | 1 | 2 | 3 | 4 |
|---|---|---|---|---|
| Product | | | | |
| Composition | 25% bentonite 75% diatomite | Same | Same | Same. |
| Non-milling Fan Speed (R. P. M.) | 4,000 | 4,000 | 4,000 | 4,000. |
| Milling Fan Speed (R. P. M.) | 4,000 | 2,200 | 1,650 | 4,000. |
| Drier Inlet Temperature, °F | 700 | 700 | 700 | 700. |
| Calcining Temperature, °F | 1,800 | 1,800 | 1,800 | 1,800. |
| Screen Analysis of Product: | | | | |
| +28 mesh | 2% | 8% | 23% | 44%. |
| +35 mesh | 4% | 12% | 15% | 17%. |
| +48 mesh | 10% | 20% | 17% | 15%. |
| +100 mesh | 39% | 35% | 26% | 18%. |
| +200 mesh | 20% | 12% | 10% | 4%. |
| +325 mesh | 10% | 5% | 4% | 1%. |
| −325 mesh | 16% | 8% | 6% | 1%. |

In test Number 4 in the above table, the pugging operation was carried substantially beyond the mealy stage, with the result that excessively large agglomerate granules were formed which were too coarse to be effectively broken down to fluidizable microspheres during the flash drying and milling treatment.

The following table demonstrates that under properly adjusted conditions of pugging, flash drying and milling a product of suitable fluid flow and attrition resistance is obtainable, when employing bentonite binder within the weight proportions of 5–25% of the total microsphere weight. In the table the properties given for the product are those determined after the product was calcined in a rotary calciner for one hour at 1800° F. A properly pugged, flash dried and milled product exhibits fluid flow properties throughout the calcining operation, so that there is no tendency of granules to stick together or agglomerate from the calcining.

| Sample No. | 1 | 2 | 3 | 4 | 5 |
|---|---|---|---|---|---|
| Product Composition, Wt. ratio bentonite and diatomite____percent__ | 25/75 | 20/80 | 15/85 | 10/90 | 5/95 |
| Bulk Density, lbs./cu. ft____ | 39.2 | 28.0 | 26.4 | 26.4 | 28.8 |
| Non-milling Fan Speed (R. P. M.)____ | 4,000 | 4,000 | 4,000 | 4,000 | 4,000 |
| Milling Fan Speed (R. P. M.)__ | 3,500 | 3,500 | 2,200 | 2,200 | 2,200 |
| Drier Inlet Temperature, °F____ | 700 | 700 | 700 | 700 | 700 |
| Calcining Temperature, °F__ | 1,800 | 1,800 | 1,800 | 1,800 | 1,800 |
| Attrition Test____ | 95.6 | 93.4 | 94.1 | 94.6 | 92.7 |
| Water Absorption____percent__ | 82 | 89 | 118 | 120 | 110 |
| Screen Analysis of Product: | | | | | |
| +28 mesh____percent__ | 1 | 7 | 12 | 5 | 11 |
| 28/35 mesh____do____ | 3 | 8 | 9 | 5 | 10 |
| 35/48 mesh____do____ | 6 | 11 | 11 | 9 | 13 |
| 48/100 mesh____do____ | 29 | 25 | 30 | 30 | 25 |
| 100/200 mesh____do____ | 26 | 19 | 18 | 19 | 15 |
| 200/325 mesh____do____ | 13 | 11 | 8 | 10 | 10 |
| −325 mesh____do____ | 21 | 18 | 12 | 20 | 16 |

In the foregoing table the data on water absorption indicates the porosity of the product in terms of the proportional weight of water absorbed in a unit of time by the standard Gardner-Coleman test as modified for water.

The attrition values represent the portion of a 60/150 mesh sample that is still coarser than 325 mesh after the sample has been repeatedly impinged on a stainless steel plate by an air jet, under standardized test conditions.

It will be understood that the details given are for the purpose of illustration, not restriction, and that variations within the spirit of the invention are intended to be included in the scope of the appended claims.

What I claim is:

1. The method of producing spherular siliceous catalyst carrier aggregate granules suitable for fluidization and having a density in the range 25–40 lbs./cu. ft. and high attrition resistance which comprises, thoroughly moistening finely divided diatomaceous silica and a bonding clay with water and subjecting the moist material to prolonged pugging with gradual addition of more diatomaceous silica, thereby developing a granular agglomerate, subjecting the thus formed moist agglomerate granules while in gas suspension to a drying treatment accompanied by agitation and rolling of the granules to develop a spherular shape, separating from the resulting dry product excessively fine and coarse material, and calcining the resulting spherular granules with rolling agitation at a temperature in the range 1800–2200° F.

2. The method of producing spherular siliceous catalyst carrier aggregate granules suitable for fluidization and having a silica content of at least 67.5% and a bulk density of 25–40 lbs./cu. ft. which comprises, moistening a charge of finely divided diatomaceous silica and a bonding clay with water and pugging the moist mixture while gradually adding additional finely divided dry diatomaceous silica thereto to thereby develop a granular agglomerate, subjecting the granular agglomerate while in gas suspension to a drying treatment accompanied by rolling of the granules to develop a spherular shape, separating from the thus formed product excessively fine and coarse material, and calcining the granular product with simultaneous agitation thereof at temperatures in the range 1800–2200° F.

3. The method of producing microspherular siliceous catalyst carrier aggregate granules having fluid flow properties and high attrition resistance which comprises, pugging finely divided diatomaceous silica and 5–25% of the dry mixture of ceramic clay, moistened with 40–50% by weight of water, under conditions of gradual addition of the dry silica developing a granular agglomerate of mealy consistency, subjecting the wetted agglomerate while in gas suspension to a flash drying and spherulizing treatment to develop spherular granules chiefly classifying within the fluidizable range of size of 20–300 microns diameter, separating from the milled product excessively fine and coarse material, and calcining the fluidizable product at a temperature approximating 1800° F.

4. The method of producing spherular siliceous catalyst carrier aggregate granules having fluid flow properties and high attrition resistance which comprises, pugging a mixture of finely divided diatomaceous earth and 5–25% dry weight of bentonite clay with 40–50% water to develop a granular agglomerate of mealy consistency, flash drying, milling, and spherulizing said granular agglomerate while in gas suspension to develop a large fraction thereof within the fluidizable size range of 20–300 microns diameter, separating and recycling excessively fine and coarse material, and subjecting the fluidizable fraction to calcining at a temperature approximately 1800° F.

5. The method of producing microspherular siliceous catalyst carrier aggregate granules having fluid flow properties and high attrition resistance which comprises, thoroughly plasticizing a measured proportion of bentonite clay with water, admixing a measured amount of finely divided diatomaceous silica with the resulting moist clay, pugging the resulting mixture while gradually adding additional dry diatomaceous silica thereto and adjusting the moisture content to develop a granular aggregate of mealy consistency containing 40–50% water and 5–25% dry weight of bentonite clay, flash drying, milling and spherulizing said granular agglomerate while in gas suspension to develop a large fraction thereof within the size range of 20–300 microns diameter, separating and recycling excessively fine and coarse material, and subjecting the retained product to calcining with continuous agitation at a temperature not substantially below 1800° F.

6. A siliceous catalyst carrier suitable for fluidization comprising microspherular aggregate granules of diatomaceous earth particles, at least 50% by weight of said particles being less than 5 microns in size, ceramically bonded with 5–25% by weight of clay, each of said granules having a substantially uniform, homogeneous composition, said granules having a size distribution chiefly within the range of 20–300 microns diameter, a bulk density of 25–40 lbs./cu. ft., high attrition resistance by standard steel plate impingement test, Gardner-Coleman water absorption of 50–120%, and resistance against structural change at temperatures up to 2000° F.

7. A siliceous catalyst carrier suitable for fluidization comprising microspherular aggregate granules of diatomaceous earth particles, at least 50% by weight of said particles being less than 5 microns in size, ceramically bonded with 5–25% by weight of bentonite clay, each of said granules having a substantially uniform, homogeneous composition, said granules having a size distribution chiefly within the range of 20–300 microns diameter, a bulk density of 25–40 lbs./cu. ft., high attrition resistance by standard steel plate impingement test, Gardner-Coleman water absorption of 50–120%, and resistance against structural change at temperatures up to 2000° F.

8. A siliceous catalyst carrier suitable for fluidization comprising microspherular aggregate granules of diatomaceous earth particles, at least 50% by weight of said particles being less than 5 microns in size, ceramically bonded with 5–25% by weight of bentonite clay, each of said granules having a substantially uniform, homogeneous composition, said granules having a size distribution of not to exceed 35% coarser than standard 48 mesh screen and at least 40% through 48 mesh screen and retained on 200 mesh screen, a bulk density of 25–40 lbs./cu. ft., high attrition resistance by standard steel plate impingement test, Gardner-Coleman water absorption of 50–120%, and resistance against structural change at temperatures up to 2000° F.

References Cited in the file of this patent

UNITED STATES PATENTS

| Number | Name | Date |
|---|---|---|
| 1,435,972 | Olsson | Nov. 21, 1922 |
| 1,792,058 | Atkinson | Feb. 10, 1931 |
| 2,035,845 | Stanton | Mar. 31, 1936 |
| 2,038,653 | Gilbert | Apr. 28, 1936 |
| 2,107,215 | Rembert | Feb. 1, 1938 |
| 2,112,380 | Price | Mar. 29, 1938 |
| 2,423,686 | Cummins | July 8, 1947 |
| 2,454,942 | Pierce et al. | Nov. 30, 1948 |
| 2,478,757 | Foster | Aug. 9, 1949 |